United States Patent [19]

Monk

[11] Patent Number: 5,178,100
[45] Date of Patent: Jan. 12, 1993

[54] ANIMAL LITTER BOX

[75] Inventor: Homer L. Monk, Raleigh, N.C.

[73] Assignee: Roseita A. Braddock, Spencerport, N.Y.

[21] Appl. No.: 799,374

[22] Filed: Nov. 27, 1991

[51] Int. Cl.⁵ .......................................... A01K 67/00
[52] U.S. Cl. ............................... 119/168; 229/117.02
[58] Field of Search .............. 119/168, 165; 229/101, 229/117.02, 112, 113, 122

[56] References Cited

U.S. PATENT DOCUMENTS

| | | | |
|---|---|---|---|
| 577,416 | 2/1897 | Brown | 229/117.02 |
| 823,813 | 6/1906 | Ronconi | 229/117.02 |
| 3,108,569 | 12/1961 | Kundikoff . | |
| 3,254,826 | 6/1966 | Keith | 229/101 |
| 3,291,372 | 12/1966 | Saidel | 229/101 |
| 3,877,631 | 4/1975 | Lai et al. | 229/117.02 |
| 4,181,095 | 1/1980 | Sylogye | 119/168 |
| 4,348,982 | 9/1982 | Selby . | |
| 4,624,380 | 11/1986 | Wernette | 119/168 |
| 4,760,816 | 8/1988 | Rhodes . | |
| 4,782,788 | 11/1988 | Arcand . | |
| 4,791,883 | 12/1988 | Lehman et al. . | |
| 4,792,082 | 12/1988 | Williamson . | |
| 4,800,842 | 1/1989 | Jones, Jr. . | |
| 4,807,808 | 2/1989 | Reed | 119/168 |
| 4,846,103 | 7/1989 | Brown | 119/168 |
| 4,884,527 | 12/1989 | Skirvin . | |
| 4,913,091 | 4/1990 | O'Connor . | |
| 4,919,078 | 4/1990 | Morrison . | |
| 4,940,016 | 7/1990 | Heath . | |
| 4,976,218 | 12/1990 | Cirami . | |
| 4,981,104 | 1/1991 | Goodwin . | |
| 4,986,217 | 1/1991 | Robinson et al. | 119/168 |
| 5,014,649 | 5/1991 | Taft . | |
| 5,027,748 | 7/1991 | Wolak . | |

FOREIGN PATENT DOCUMENTS 2618050  1/1989  France .

Primary Examiner—Cary E. O'Connor
Assistant Examiner—Todd E. Manahan
Attorney, Agent, or Firm—Frank Pincelli

[57] ABSTRACT

A disposable cat litter box comprises a bottom box portion for carrying litter material, a top box portion and a collapsible shell support structure. The bottom box portion has a bottom wall, a pair of end wals extending upwardly from the bottom wall and a pair of side walls extending upwardly from the bottom wall. The side and end walls have an inner and an outer surface. The top box portion is designed to engage the bottom box portion. The top box portion has a top wall, a pair of end walls extending downwardly from the top wall and a pair of side walls extending downwardly from the top wall. The side and end walls of the top box portion have an inner and an outer surface. The inner surface is designed to fit snugly adjacent the outer surface of the bottom box portion. The collapsible shell support structure is designed for folding and unfolding between an expanded position, in which the top box portion is supported above the bottom box portion so as to form a substantially enclosed litter box, and a collapsed shipping, storage, and disposable condition, in which the shell support structure lies substantially flat.

13 Claims, 5 Drawing Sheets

ANIMAL LITTER BOX

BACKGROUND OF THE INVENTION

The present invention relates to disposable litter boxes, and more particularly, to a collapsible litter box which is simple and low cost to manufacture, simple to erect, and provides a durable and sturdy enclosure.

The prior art has suggested various disposable litter boxes that come in various configurations. Examples of such constructions are found in U.S. Pat. Nos. 4,348,982; 4,760,816; 4,776,300; 4,782,788; 4,791,883; 4,792,082; 4,807,808; 4,884,527; 4,913,091; 4,940,016; 4,976,218; 4,981,104; 4,986,217; 5,027,748 and 5,014,649. Some of these litters boxes are sold preassemble and some are sold in pieces requiring complicated assembly, while others are sold in a collapsed configuration. The collapsible type structures are provided with fresh litter in the collapsed configuration and which when expanded to its operative configuration provides an enclosure which allows the cat or other pet to enter and use the litter.

Prior art litter boxes suffer from various deficiencies. Some are very expensive to manufacture while others are complicated in structure requiring numerous elements. While others suffer from being difficult to assemble or unfold to the expanded configuration. Collapsible type structures rely on various folding techniques to allow folding of the structure. However, while these various folding techniques assist greatly in providing the box assembly in a compact form, they provide a structure in the expanded configuration which relatively unstable and is subject to collapse during normal use. For example, U.S. Pat. No. 4,986,217 relies on friction between adjacent panels to maintain the side walls in their upright position. Thus the side walls are subject to being easily collapsed inwardly by any external force applied thereto. A person, object or an animal applying a force against the side can cause the side walls to easily fall inward.

Applicant has invented a disposable kitty litter box which is simple in construction, easily expanded from its folded condition to its fully expanded condition, is extremely durable in its expanded condition, is low cost in design and manufacture, and can easily be broken down for disposable.

SUMMARY OF THE INVENTION

A disposable cat litter box comprising a bottom box portion for carrying litter material, a top box portion and a collapsible shell support structure. The bottom box portion has a bottom wall, a pair of end walls extending upwardly from said bottom wall and a pair of side walls extending upwardly from said bottom wall. The side and end walls having an inner surface and outer surface.

The top box portion is designed to engage the bottom box portion. The top box portion has a top wall, a pair of end walls extending downwardly from the top wall and a pair of side walls extending downwardly from the top wall. The side and end walls of the top box portion having an inner surface and an outer surface. The inner surface being designed to fit snugly adjacent the outer surface of the bottom box portion.

The collapsible shell support structure is designed for folding and unfolding between an expanded position in which the top box portion is support above the bottom box portion so as to form a substantially enclosed litter box; and a collapsed shipping, storage, and a disposable condition in which the shell support structure lies substantially flat.

DETAILED DESCRIPTION OF THE INVENTION

Figure 1:
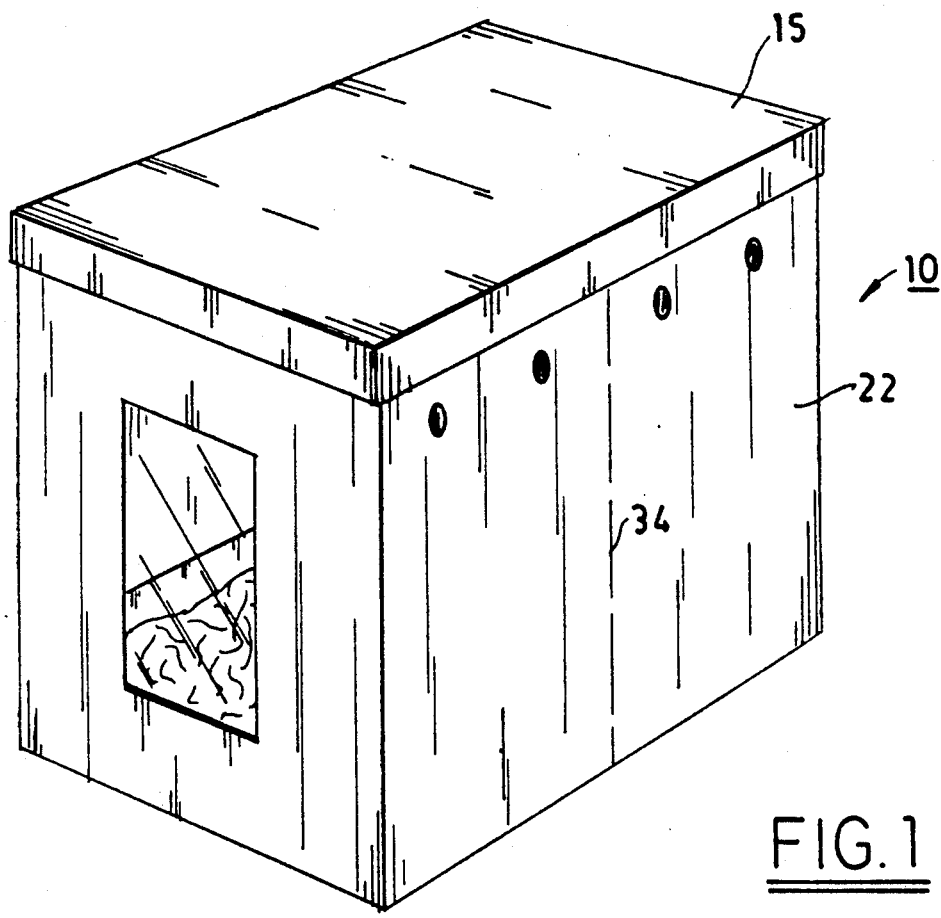
FIG. 1 illustrates a perspective view of a disposable litter box made in accordance with the present invention in the expanded in use configuration.

Referring to FIGS. 1-4, there is illustrated a disposable litter box 10 made in accordance with the present invention in the unfolded expanded in use configuration. The litter box 10 comprises a bottom box portion 12 designed to hold litter 14, a top box portion 15 and a collapsible shell structure 22. In the preferred embodiment illustrated the litter box 10 is designed for use by cats. The bottom box portion 12, top box portion 15 and shell structure 22 are each preferably constructed of a corrugated cardboard, but other suitable hard board materials may be employed. In the particular embodiment illustrated, the bottom box portion 12, top box portion 15 and shell structure 22 are constructed of a single fluted double walled corrugated cardboard.

Bottom box portion 12 includes a bottom wall 16, a pair of upwardly extending end walls 18 and pair of upwardly extending side walls 20. As can be seen, the end walls 18 and side walls 20 form a generally rectangular configuration. However, it is to be understood that the bottom box portion 12 may take any configuration desired.

Figures 2, 3:
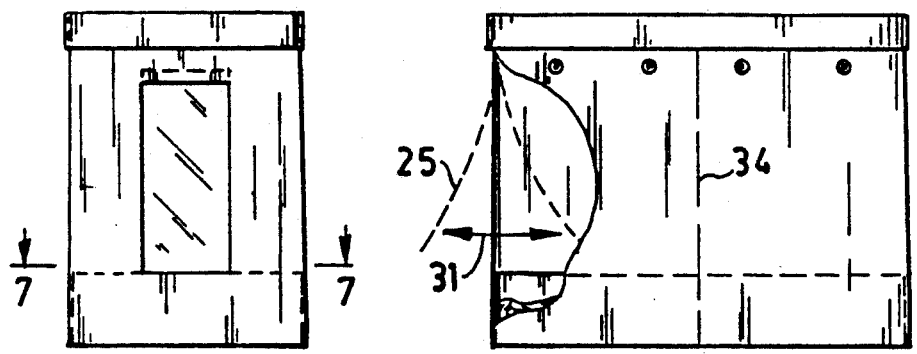
FIG. 2 is a front elevational view of the litter box illustrated in FIG. 1.
FIG. 3 is a side elevational view of the litter box of FIG. 1.
Figure 5:
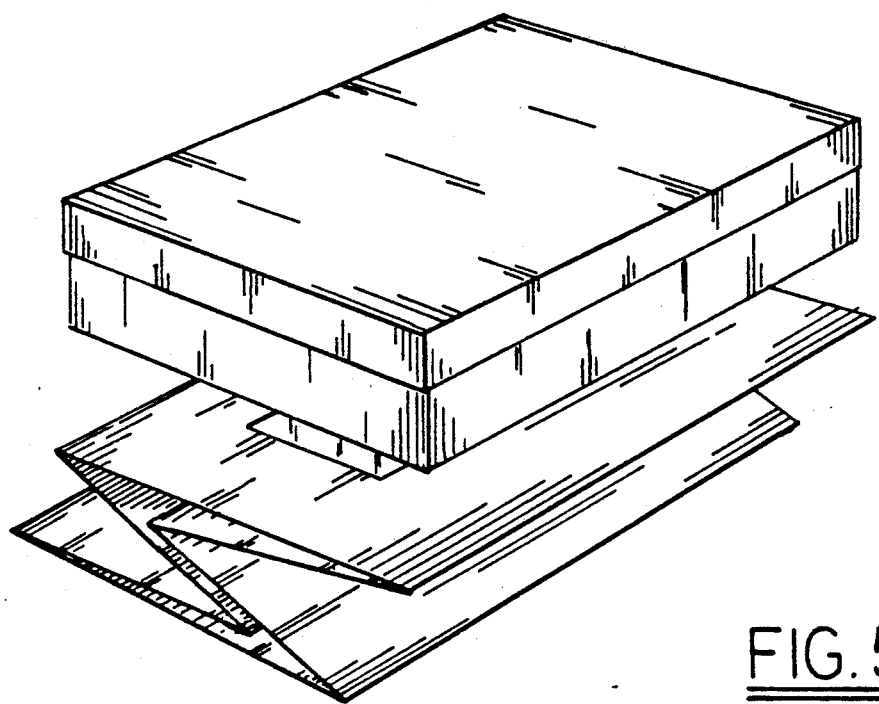
FIG. 5 is a perspective view of the litter box of FIG. 1 in the collapsed condition.
Figure 7:
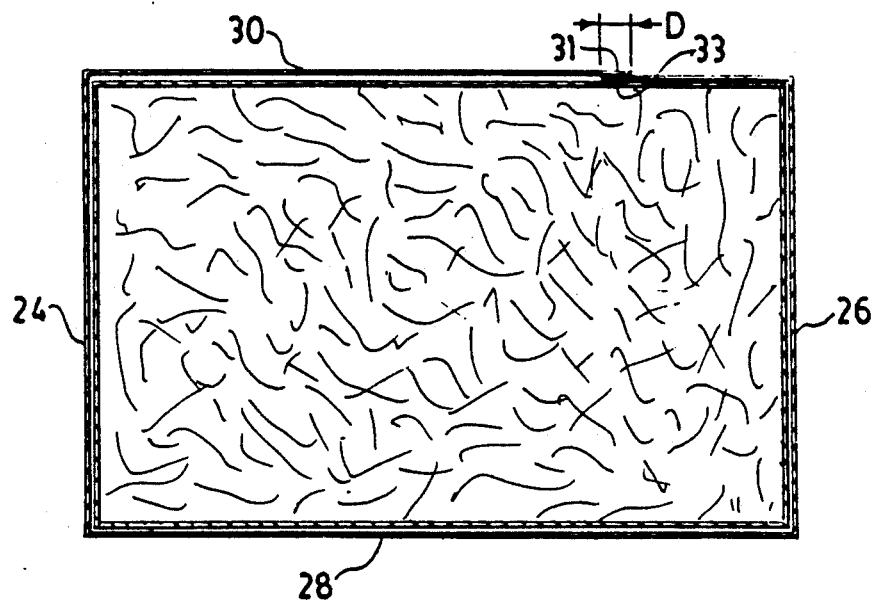
FIG. 7 is a cross sectional view of the litter box of FIG. 2 taken along lines 7—7.
Figure 8:
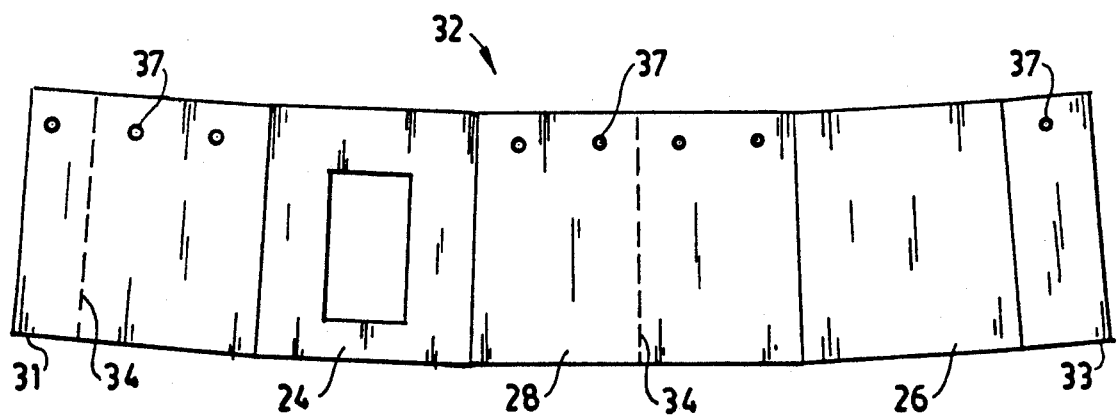
FIG. 8 is a plan view of a cardboard blank used to make the collapsible support shell of the litter box of FIG. 1.
Figure 9:
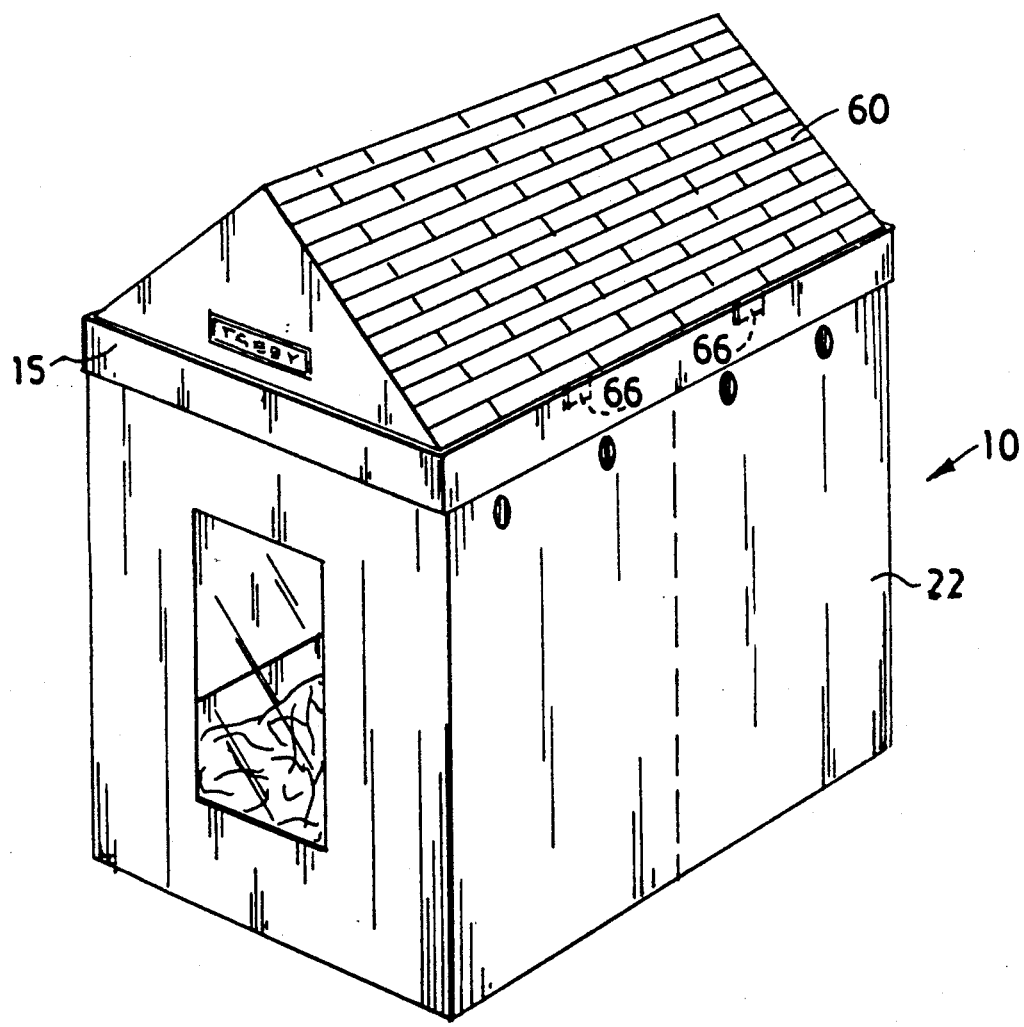
FIG. 9 is a perspective view of the litter box of FIG. 1 having an optional roof structure placed on top thereof.

The collapsible shell support structure 22 is designed for folding and unfolding between an expanded position as illustrated in FIGS. 1 and 2, and a folded collapsed position as illustrated in FIG. 5. The collapsible shell support 22 comprises a pair of end panels 24, 26 and a pair of side panels 28, 30, each panel having an upper end 27 and a lower end 29. The panels 24, 26, 28, 30 are connected together to form continuous shell support structure 22. In the preferred embodiment illustrated shell support structure 22 is made from a single continuous sheet of cardboard as illustrated in FIGS. 7 and 8. FIG. 8 illustrates an unfolded blank 32 from which shell structure 22 is formed. The panels 24, 26, 28, 30 are each separated by a fold line 21. The outer ends 31, 33, of blank 32 overlap a short distance and are simply secured together to form the closed shell structure 22. In the particular embodiment illustrated the ends 31, 33 overlap a distance D which ranges generally from about 1 to 3 inches. The ends 31, 33 are simply secured together by an appropriate adhesive. Each of the side panels 28, 30, include a substantially vertically extending fold line 34, which allows the side panels 30, 32 to fold and collapse shell structure 22 as illustrated in FIG. 5. Preferably, as illustrated the fold line 34 is substantially mid way between the side ends of the panel 28, 30 so as to allow for compact folding. Fold line 34 causes the side panels to fold inwardly such that they are positioned between end panels 24, 26 in the folded configuration. The fold line 34 allows shell support 22 to be collapsed such that it can be placed above or below top box portion 15 and bottom box portion 12. It is important that fold line 34 extends in a substantially vertical direction; a direction substantially perpendicular to bottom box portion 12. The providing of fold line 34 in this direction in conjunction with the manner shell structure 22 is secured to bottom box portion 12 and top box portion 15 in the unfolded expanded configuration provides a rigid structure capable of withstanding forces applied thereto without collapsing. The lower end 29 of panels 24, 26, 28, 30 provide an inner peripheral perimeter such that it fits snugly around the outer perimeter surface 35 of end and side walls 18, 20. Each panel having a length which appropriately corresponds to the length of the adjacent end and side walls 18, 20. Preferably the fit therebetween is sufficiently loose to allow the shell structure 22 to be easily placed over bottom box portion 12, but not too loose that the shell structure 22 can easily be accidentally removed from bottom box portion 12.

The top box portion 15 comprises a top wall 42, a pair of downwardly extending end walls 44 and a pair of downwardly extending side walls 46. The end and side walls 44, 46 form a substantailly continuous wall designed to engage the outer surface of end and side walls 18, 20 of bottom box portion 12 when the box 10 is in the collapsed configuration and to engage the upper end 27 of panels 24, 26, 28, 30 of collapsible support structure 22 when the litter box 10 is in the unfolded expanded configuration. In the same manner the lower end 24 of shell support structure 22 in the unfolded expanded condition is secured to bottom box portion 12, the upper end 27 of shell support structure 22 engages top box portion 15 except that the exterior surface of upper end 27 engages the inside surface of walls 44, 46. Thus, the upper end 17 fits snugly within the inner perimeter of the walls 44, 46 of the top box portion 40 in much the same way the bottom of a typical box engages its cover. As can be seen, the lower end 29 of the shell support structure must fit around the exterior of the bottom box portion 12, yet the upper end 27 fits within the top box portion 40. Thus, in the preferred embodiment illustrated, the shell support structure is tapered from its lower end to its upper end such that the perimeter of the upper end 27 is less than the perimeter of the lower end 29. Accordingly, each of the panels 24, 26, 28, 30 each have a slightly trapezoidal configuration which allows the reduced perimeter to occur as illustrated in FIG. 8. When fully assembled, the disposable litter box is easy to assemble, yet provides a rigid structure such that the cat entering or leaving will not affect the structural integrity of the litter box, nor will the sides or the box easily collapse due to external pressures being applied by an individual that brushes up against the litter box 10.

End panel 24 of shell structure 22 is provided with an opening 23 which allows a cat or other pet to enter and use the litter box. In the preferred embodiment illustrated, a door flap 25 is secured to end panel 24 which freely moves back and forth across opening 23 as illustrated by arrow 31 in FIG. 3. In the particular embodiment illustrated, the top of flap 25 is secured to panel 24 at its upper end by tape or adhesive means such that it can flex easily will allow the pet to either enter or leave the enclosure. In the particular embodiment illustrated flap 25 is a clear plastic sheet of material.

In the preferred embodiment illustrated a plurality of openings 37 are provided in shell structure 22 to allow appropriate ventilation and/or light to enter within the expanded litter box 10. In the particular embodiment illustrated, there is illustrated four substantially circular openings 37 at the upper end 27 of the side panels 28, 30. It is understood that the number of openings 37, their location and their shape may be varied as desired, as long as the structure integrity of the box 12 is not substantially affected.

In the preferred embodiment illustrated the inner surface 39 of the bottom box portion 12 is coated with a thin layer 41 of an appropriate material which is resistant to moisture penetrating the box. In the particular embodiment illustrated layer 41 comprises a thin plastic film made of polyvinylchloride. However, it is to be understood that any other plastic, wax, or other material may be used to provide a moisture barrier.

Figure 4:
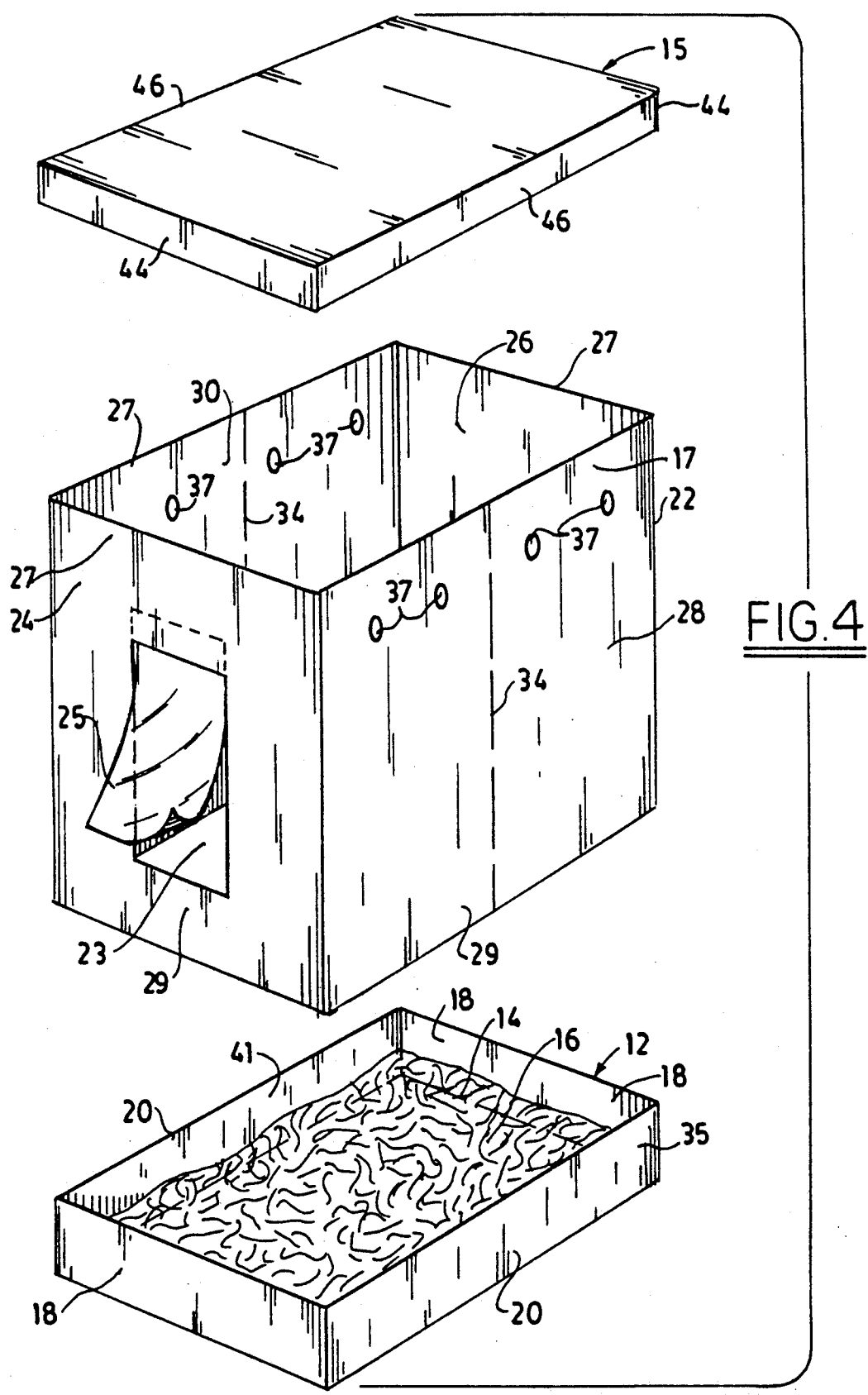
FIG. 4 is an exploded perspective view of the disposable litter box of FIG. 1.
Figure 6:
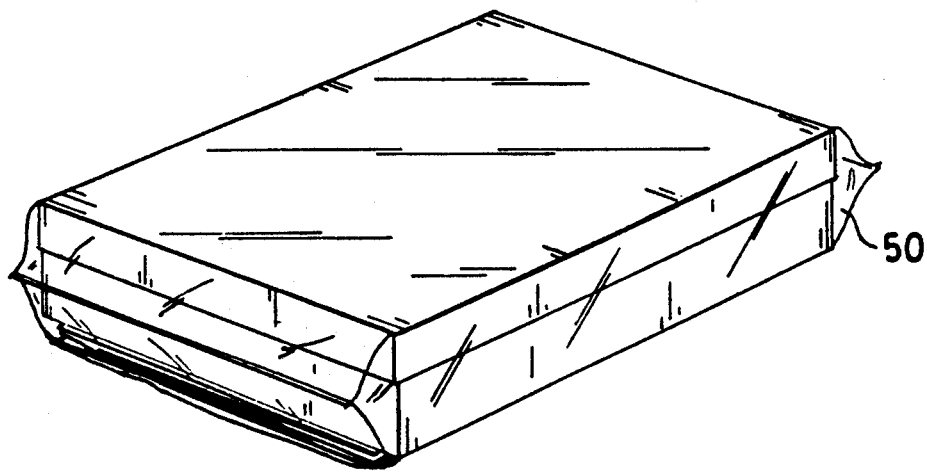
FIG. 6 is a perspective view of the collapsed litter box of FIG. 5 having a shrink wrap holding the packaged assembly together.

Referring to FIG. 6, there is illustrated the litter box 10 in the unfolded collapsed configuration as sold to the purchaser. In this form the top cover 40, bottom cover 12 and collapsible structure 22 are sold as a kit and are held together by a shrink wrap 50. However, the components may be secured together by any other convenient means. As can be seen, the top box portion 15 engages the bottom box portion 12 containing the litter therein. The unfolded shell support structure can be placed on top of or beneath the closed box. After removal of the means used to secure the components together, the collapsible shell support structure 22 is taken out and expanded to position as illustrated in FIG. 4. The top cover portion 15 is removed from bottom box potion 12. Thereafter, the lower end 29, 33 of panels 24, 25, 30, 32 is placed around the outer peripheral of the bottom box portion 12. If desired, means may be provided at the lower end 29 of panels 24, 26, 28, 30 which engages bottom box portion 12 which assists the user in easily identifying portion of shell structure 22 with the bottom box portion 12. For example, but not by way of limitation, the lower end 29 may be provided with recess notches which mate with projections on the box portion 12. Similar identifying means may be placed on the upper end 27 of shell support structure 22 and top box portion 15. The shell support structure 22 is designed to provide a snug fit around bottom box portion 12 such that no other means are necessary to secure the two elements together. However, if desired, additional means may be provided for securing the two elements together. The top box portion 15 is then placed on top of shell support structure 22 to complete the enclosure. The litter box 10 is then ready for use by pet.

It is, of course, understood that various changes and modifications can be made. For example, the sides of the shell support structure 22 may be provided with an appropriate design pleasing to owner of the pet. Accordingly, various sceneries or designs may be placed thereon to provide the desired aesthetic appearance. Additionally, the size of the shell structure 22 and associated top box portion and bottom box portion may be varied as desired.

If desired, an optional roof structure 60 may be placed on the litter box 10 to provide a more conventional appearance, as illustrated in FIG. 8. In the particular embodiment illustrated roof structure 60 is placed on top box portion 15 so as to provide a general overall appearance of a house. It is, of course, understood that the roof structure 60 may be provided with appropriate designs thereon so as to provide the desired overall aesthetic appearance, for example, but not limited to that of a shingled roof. The roof structure 60 may simply be placed on top of box portion 15 or secured thereto by any appropriate means, for example, by tabs provided in the roof structure 66 which extends into the opening provided in top box portion 15 or by tape or other adhesive means.

Due to the unique structure of the present invention, a litter box 10 is provided which allows quick and easy assembly and after use, can be easily disposed. After the top box portion 15 is removed, the collapsible shell structure 22 is then removed. Thereafter, the top box portion 15 is placed over the bottom box portion 12 having the used litter. The used box 10 is then properly disposed of. Since the outer shell does not come in direct contact with the litter, it is possible to reuse shell support structure 22. Thus, the pet owner need only purchase a refill litter box, comprising only of a top box portion 15 and bottom box portion 12 filled with litter having the appropriate dimensional configurations to mate with the saved collapsible shell portion 22. In this way the cost of replacing the entire litter box 10 is reduced even further, while still having the benefit of an enclosed kitty litter box.

Further modifications may be made to the present invention without departing from the scope of the present invention. The present invention being limited by the following claims.

I claim:

1. A disposable pet litter box comprising:
a bottom box portion for carrying litter material, said bottom box portion having a bottom wall, a pair of end walls extending upwardly from said bottom wall and a pair of side walls extending upwardly from said bottom wall, said side and end walls having an inner surface and outer surface;
a top box portion for engagement with said bottom box portion, said top box portion having a top wall, a pair of end walls extending downwardly from said top wall and a pair of side walls extending downwardly from said top wall, said side and end walls of said top box portion having an inner surface and an outer surface, the inner surface of said side and end walls of said top box portion having a size such that it fits snugly adjacent the outer surface of said side and end walls of said bottom box portion; and
a collapsable continuous shell support structure configured for folding and unfolding between an expanded position in which the top box portion is supported above the bottom box portion so as to form a substantially enclosed pet litter enclosure which allows a pet to enter and use the pet litter box; and a collapsed shipping, storage, and a disposable condition in which the shell support structure lies substantially flat, the shell support structure including first and second end panels, each having an upper end and a lower end and a pair of first and second side panels, each having an upper end and a lower end, said side and end panels being continuously connected so as to form a closed shell structure such that when said shell support structure is in the unfolded expanded position, the lower ends of said first and second panels are placed adjacent the outer surface of said side and end walls of said bottom box portion and the top ends of said first and second panels are placed adjacent the inner surface of said side and end walls of said top box portion, one of said panels having an opening to allow egress or ingress of a pet so as to allow use thereof by the pet, said shell support structure having a generally trapezoidal configuration such that the lower ends of the panels have a first perimeter which is greater than the perimeter of the upper ends of said panels of said shell structure.

2. A disposable pet litter box according to claim 1 wherein said first and second side panels are provided with vertically extending fold lines to allow folding of said shell support structure to the folded collapsed state.

3. A disposable pet litter box according to claim 1 wherein the inner surface of said bottom box portion is provided with a coating which is resistant to penetration of moisture.

4. A disposable pet litter box according to claim 1 wherein said collapsible shell support structure is provided in a collapsed form on said disposable pet litter box with said top box portion engaging said bottom portion, said collapsable shell, bottom box portion and top box portion being held together by shrink wrap.

5. A disposable pet litter box according to claim 1 wherein means are provide for identifying the top end of said panels which engages said top box portion.

6. A disposable pet litter box according to claim 1 wherein said top box portion has a substantially rectangular configuration.

7. A disposable pet litter box comprising:
a bottom box portion for carrying litter material, said bottom box portion having a bottom wall, a pair of end walls extending upwardly from said bottom wall and a pair of side walls extending upwardly from said bottom wall, said side and end walls having an inner surface and outer surface, said bottom box portion containing a predetermined amount of litter;
a top box portion for engagement with said bottom box portion, said top box portion having a top wall, a pair of end walls extending downwardly from said top wall and a pair of side walls extending downwardly from said top wall, said side and end walls of said top box portion having an inner surface and an outer surface, the inner surface of said side and end walls of said top box portion being designed to fit snugly adjacent the outer surface of said side and end walls of said bottom box portion; and
a continuous shell support structure for supporting said top box portion above the bottom box portion so as to form a substantially enclosed pet litter enclosure having an opening which allows a pet to enter and use the litter box, the lower end of said shell support structure having a perimeter of a first length which is designed to be placed adjacent the outer surface of said end walls of said bottom box portion and the top end of the shell support structure having a perimeter of a second length which is designed to be placed adjacent the inner surface of said side and end walls of said top box portion, said first length being greater than said second length.

8. A disposable pet litter box according to claim 7 wherein said shell support structure is provided with vertically extending fold lines to allow folding of said shell structure to the folded collapsed state.

9. A disposable pet litter box comprising:
a bottom box portion for carrying litter material, said bottom box portion having a bottom wall, a pair of end walls extending upwardly from said bottom wall and a pair of side walls extending upwardly from said bottom wall, said side and end walls having an inner surface and outer surface, said bottom box portion containing a predetermined amount of litter;
a top box portion for engagement with said bottom box portion, said top box portion having a top wall, a pair of end walls extending downwardly from said top wall and a pair of side walls extending downwardly from said top wall, said side and end walls of said top box portion having an inner surface and an outer surface, the inner surface of said side and end walls of said top box portion having a size such that it fits snugly adjacent the outer surface of said side and end walls of said bottom box portion; and
a collapsable continuous shell support structure configured for folding and unfolding between an expanded position in which the top box portion is supported above the bottom box portion so as to form a substantially enclosed pet litter enclosure which allows a pet to enter and use the litter box; and a collapsed shipping, storage, and a disposable condition in which the shell support structure lies substantially flat, the shell support structure including first and second end panels, each having an upper end and a lower end and a pair of first and second side panels, each having an upper end and a lower end, said side and end panels being continuously connected so as to form a closed shell structure such that when said shell support structure is in the unfolded expanded position, the lower ends of said first and second panels are placed adjacent the outer surface of said side and end walls of said bottom box portion and the top ends of said first and second panels are placed adjacent the inner surface of said side and end walls of said top box portion, one of said panels having an opening to allow egress or ingress of a pet so as to allow use thereof by the pet, said shell support structure having a generally trapezoidal configuration such that the lower ends of the panels have a first perimeter which is greater than the perimeter of the upper ends of said panels of said shell structure.

10. A disposable pet litter box according to claim 9 wherein the inner surface of said bottom box portion is provided with a coating which is resistant to penetration of moisture.

11. A disposable pet litter box according to claim 9 wherein said collapsable shell support structure is provided in a collapsed form on said disposable pet litter box with said top box portion engaging said bottom portion, said collapsable shell, bottom box portion and top box portion being held together by shrink wrap.

12. A disposable pet litter box according to claim 9 wherein means are provided for identifying the top end of said shell support structure which engages said top box portion.

13. A disposable pet litter box according to claim 9 wherein said top box portion, bottom box portion and said shell support structure each have a substantially rectangular configuration.

* * * * *